United States Statutory Invention Registration [19]

[11] Reg. Number: H10

Frank et al. [45] Published: Jan. 7, 1986

[54] CAN-OUT HATCH ASSEMBLY WITH MAGNETIC RETENTION MEANS

[75] Inventors: Robert C. Frank, Crestwood; Joseph C. Hoh, Naperville, both of Ill.

[73] Assignee: The United States of America as represented by the United States Department of Energy, Washington, D.C.

[21] Appl. No.: 752,415

[22] Filed: Jul. 3, 1985

[51] Int. Cl.[4] ..... B65D 43/14

[52] U.S. Cl. ..... 220/337; 220/200; 220/315; 220/334; 376/272

*Primary Examiner*—Donald P. Walsh

*Attorney, Agent, or Firm*—Hugh W. Glenn; Robert J. Fisher; Judson R. Hightower

[57] ABSTRACT

A can-out hatch assembly may be positioned in sealed engagement about an aperture within a chamber and is adapted to engage a cover on a container positioned over the aperture to allow the transfer of a contaminant from the chamber to the container while maintaining the contaminant as well as internal portions of the chamber and container isolated from the surrounding environment. With the container's cover engaged by the can-out hatch assembly, the hatch assembly as well as the cover may be pivotally displaced from the aperture with the cover maintaining the exterior portion of the hatch assembly isolated from the contaminant. After the contaminant is transferred from the chamber to the container, the hatch assembly and cover are again positioned in sealed engagement about the aperture. The hatch assembly then positions the cover upon the open end of the container in a sealed manner allowing the container to be removed while maintaining the chamber sealed relative to the surrounding environment. The can-out hatch assembly is particularly adapted for operation by remote control means within the sealed chamber.

22 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CAN-OUT HATCH ASSEMBLY WITH MAGNETIC RETENTION MEANS

CONTRACTUAL ORIGIN OF THE INVENTION

The United States Government has rights in this invention under Contract No. W-31-109-ENG-38 between the U.S. Department of Energy and Argonne National Laboratory.

CROSS REFERENCE TO RELATED APPLICATION

This application is related to, but in no way dependent upon, the following application which is assigned to the assignee of the present application and filed in the names of Paul J. Basnar, Robert C. Frank and Joseph C. Hoh: Ser. No. 752416, filed July 3, 1985 , and entitled "Can-Out Hatch Assembly and Positioning System".

BACKGROUND OF THE INVENTION

This invention relates generally to the remote handling of contaminants and is particularly directed to an arrangement for transferring a contaminant from a sealed chamber to a covered container while maintaining the contaminant as well as those portions of the chamber and container exposed to the contaminant isolated from the environment.

Toxic or radioactive contaminants are typically stored and transported in sealed containers which prevent their escape into the surrounding atmosphere. Government regulations mandate that these containers be structurally sound and leak proof. As a result, the greatest threat of escape of a contaminant into the atmosphere generally occurs during the transfer of the contaminant into or out of the container. During such transfers, it is absolutely essential that the inner, contaminated portions of the contaminant-containing vessels be maintained completely and permanently isolated from the outer, clean environment. This not only requires the absence of leaks from these vessels into the surrounding environment, but also requires that any surfaces in contact with the contaminants or contaminated atmosphere must not be exposed to the surrounding environment. The aforementioned related application cross referenced above provides an effective, reliable seal during contaminant transfer while precluding those portions of the transfer mechanism exposed to the contaminant from coming in contact with the surrounding, uncontaminated environment. However, this approach requires a uniquely configured container cover and thus is of limited applicability.

The present invention represents an improvement over the prior art in that it provides a safe, reliable and inexpensive arrangement for remotely transferring contaminated materials from a sealed chamber to a covered container, while limiting access to the contaminants and contaminated atmosphere only to internal portions of the container and chamber to which the surrounding environment is not exposed. The present invention has widespread applicability in that it is compatible with container covers of the general paint can type.

OBJECTS AND SUMMARY OF THE INVENTION

Accordingly, it is an object of the present invention to maintain a contaminant in isolation while transferring it between sealed containers.

It is another object of the present invention to provide an improved arrangement for transferring a contaminant between sealed containers while preventing exposure of the atmosphere and outer parts of the containers to the contaminant.

Yet another object of the present invention is to provide a safe, reliable means for maintaining a contaminant in isolation while transferring it between closed vessels.

A further object of the present invention is to provide a can-out hatch arrangement particularly adapted for use with a radioactive hot cell having improved sealing and locking characteristics for maintaining a continuous seal around the hot cell during the transfer of radioactive material out of the cell.

A still further object of the present invention is to provide a can-out hatch assembly for use in transferring a contaminant from a sealed chamber to a covered container having a lid of the general paint can type.

The present invention contemplates a can-out hatch assembly for transferring a contaminant from a sealed chamber through an aperture therein to a covered container while maintaining the contaminant as well as those portions of the chamber and container exposed to the contaminant isolated from the surrounding environment. The hatch assembly includes an elongated swing bracket pivotally mounted at a first end thereof to the inner surface of a bottom panel of the chamber which includes an aperture therein. The swing bracket is free to pivot between an upraised position and a full down position wherein a second end of the swing bracket is positioned over the aperture in the chamber's bottom panel. The swing bracket's second end includes an aperture therein within which is positioned a rotatable hub coupled at its upper end to an actuating arm and at its lower end to a hatch plate. Rotation of the actuating arm in a first direction with the swing bracket in the full down position causes the hatch plate to engage in a sealed manner the chamber's bottom panel about the aperture therein, while rotation of the actuating arm in a second direction unlocks the hatch plate from the sealed chamber allowing the swing bracket to be pivotally displaced upward in removing the hatch plate from the aperture.

Positioned within and extending beyond the upper and lower ends of the hub is a rotatable actuating shaft having a hex head upper end and coupled by means of a shoulder screw to a generally planar pressure plate at its lower end. The pressure plate is positioned beneath the hatch plate and is adapted for displacement toward and away from the hatch plate in response to rotation of the actuating shaft in either a first or a second direction. A ferrous cover loosely positioned upon the container is engaged by a plurality of magnets suspended from the hatch plate and is removed from the container when the hatch plate is raised by rotation of the actuating arm in a first direction. The contaminant may then be transferred from the chamber to the container while the container's cover shields the lower surface of the pressure plate from exposure to the contaminant. The swing arm is then lowered and the hatch plate is locked in sealed engagement around the chamber's aperture by rotating the actuating arm in the second direction. Rotation of the actuating shaft in the first direction displaces the pressure plate downward forcing the cover into sealed engagement with the container which is then sealed and may be removed from adjacent to the aperture within the chamber which is also then sealed by the hatch plate. The exposed surface of the pressure plate remains uncontaminated having been shielded from the contaminant by the container's cover. The can-out hatch assembly of the present invention is particularly adapted for use with a container cover of the general paint can type having an upward extending lip around the periphery thereof.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
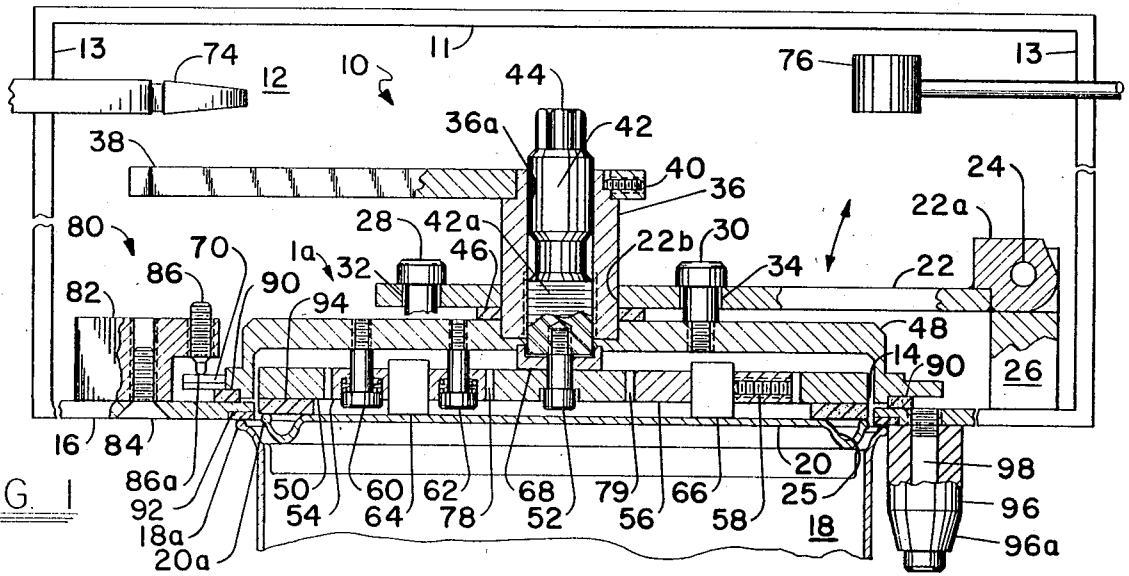
FIGS. 1 and 1*a* are a partially cutaway side view of a can-out hatch assembly with an enlarged detail of a magnetic cover retention means for use in transferring a contaminant from a sealed chamber to a covered container.
Figure 1A:
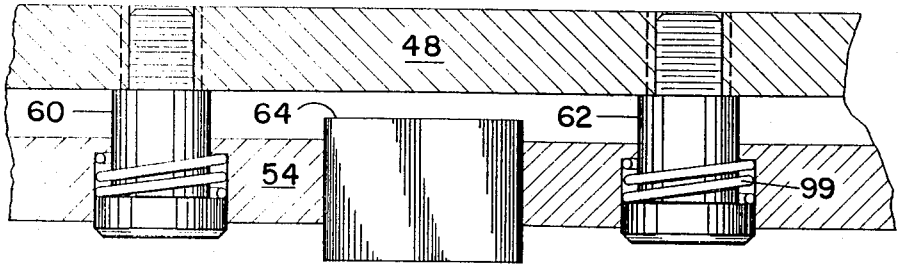
Figure 2:
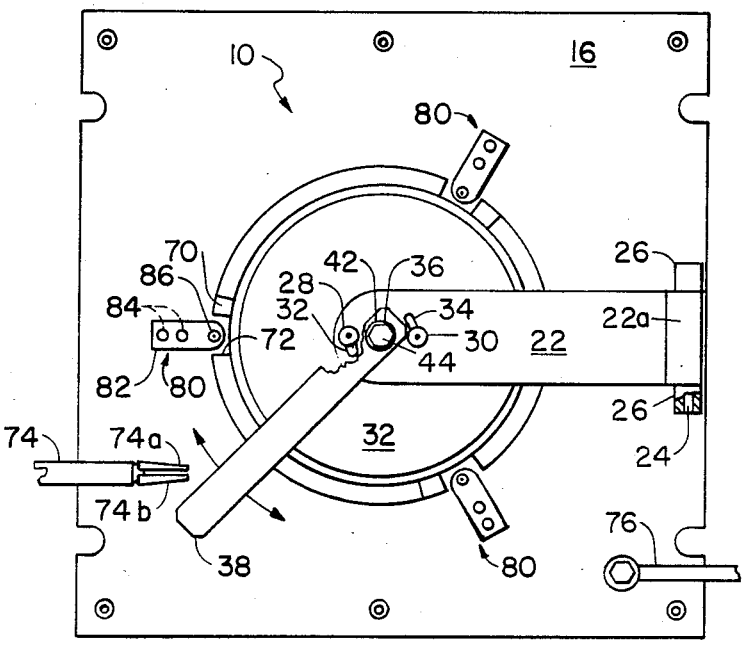
FIG. 2 is a plan view of the can-out hatch assembly of FIG. 1 shown in positions so as to cover the aperture within the sealed chamber.

Referring to FIGS. 1 and 2, there are respectively shown a partially cutaway side view and a plan view of a can-out hatch assembly 10 in accordance with the present invention.

The can-out hatch assembly 10 is positioned within and mounted to a sealed chamber 12 having a top panel or wall 11, a plurality of lateral panels 13, and a bottom panel 16. The bottom panel 16 includes a generally circular aperture 14 therein. A generally circular container 18 having a ferrous cover, or lid, 20 positioned thereon is adapted for positioning in engaging contact with a lower surface of the chamber's bottom panel 16 and about the aperture 14 therein. With the container 18 thus positioned in sealed engagement with the chamber's bottom panel 16, the can-out hatch assembly 10 may be released from sealed engagement with an upper surface of the chamber's bottom panel for displacement from the aperture therein and removal of the cover 20 from the container. A contaminant (not shown) may then be transferred from within the sealed chamber 12 to the container 18 by a remote controller 74 positioned within the chamber. Following transfer of the contaminant, the can-out hatch assembly 10 is then moved to its initial position, as shown in the figures, so as to cover the aperture 14 in the sealed chamber 12 and to securely position the cover 20 upon the container 18 in a sealed manner whereupon the container may be removed from the sealed chamber's aperture and replaced by another container in which additional contaminated material may be transferred from the sealed chamber.

More specifically, the can-out hatch assembly 10 includes a swing bracket or pivot arm 22 pivotally coupled at a first end 22*a* thereof to an inner surface of the chamber's bottom panel 16. The pivot end 22*a* of the swing bracket 22 is coupled to the chamber's bottom panel 16 by means of the combination of a pivot pin or hinge shaft 24 and a pivot bracket or hinge base 26. This arrangement permits the swing bracket 22 to be pivotally displaced between a lowered, generally horizontal orientation as shown in FIG. 1, and an upraised position wherein the swing bracket is displaced away from the chamber's bottom panel 16.

A second end of the swing bracket 22 is provided with an aperture 22*b* therein. Positioned within the swing bracket's aperture 22*b* and free to rotate therein is a hub 36. While the lower portion of the hub 36 has a generally circular cross section, the upper end thereof is provided with four sides and is generally square in shape. In addition, the hub 36 is provided with a generally circular bore 36*a* extending the length thereof. Positioned over the upper end of and engaging the hub 36 is a generally horizontally oriented actuating arm or handle 38. Securely coupled to a lower end of the hub 36 is a generally circular hatch plate or cover 48. The actuating arm 38 is maintained in position upon the upper end of the hub 36 by means of a set screw 40, while the lower end of the hub is coupled to the hatch plate 48 by conventional means such as welding. With the hub 36 rotatable within the swing bracket 22, the hatch plate 48 may be rotationally displaced relative to the swing bracket by rotational displacement of the actuating arm 38. A thrust washer or spacer 46 is positioned around the hub 36 and between the swing bracket 22 and the hatch plate 48 to facilitate rotational displacement therebetween.

Also positioned within the second end of the swing bracket 22 on opposing sides of the aperture 22*b* therein are first and second rotational displacement limiting apertures 32, 34. Positioned within each of the first and second rotational displacement limiting apertures 32, 34 is a respective shoulder screw 28, 30 which threadably engage portions of the hatch plate 48 immediately below each of the rotational displacement limiting apertures. The respective ends of the generally elongated first and second rotational displacement limiting apertures 32, 34 limit the rotational displacement of the combination of the actuating arm 38, the hub 36, and the hatch plate 48 by limiting the displacement of a respective shoulder screw 28, 30.

Mounted to the upper, inner surface of the chamber's bottom panel 16 in spaced relation around the aperture 14 therein are a plurality of locking assemblies 80. Each of the locking assemblies 80 includes a lock down bracket 82 securely coupled to the chamber's bottom panel 16 by means of a pair of mounting screws 84. Threadably positioned within and engaged by the lock down bracket 82 is a lock down pin 86. Each of the lock down pins 86 includes a lower end 86*a* extending downward therefrom.

That portion of each of the lock down brackets 82 which includes the lock down pin 86 extends over a peripheral portion of the hatch plate 48. The inner portion of the hatch plate 48 is generally upraised relative to the peripheral portion thereof. Positioned about the peripheral portion of the hatch plate 48 in spaced relation are a plurality of combinations of adjacent cam surfaces 70 and slots 72. The hatch plate 48 is positioned in sealed engagement with the bottom panel 16 of the sealed chamber 12 by aligning each of the locking assemblies 80 with a respective slot 72 within the periphery of the hatch plate. The hatch plate 48 is then displaced downward by pivoting the swing bracket 22 in a counterclockwise direction as shown in FIG. 1 so that a lower portion of its periphery is positioned in engagement with a generally circular outer gasket 90 positioned around the aperture 14 in the chamber's bottom panel 16. By rotating the hatch plate 48 by means of the actuating arm 38 in a counterclockwise direction as shown in FIG. 2, each of the cam surfaces 70 will be positioned in engagement with a corresponding lower tip 86a of a lock down pin 86 forcing the hatch plate in a generally downward direction and in sealed engagement with the outer gasket 90 positioned on the chamber's bottom panel 16. The hatch plate 48 may be unlocked from sealed engagement with the chamber's bottom panel 16 by rotating the actuating arm 38 in a clockwise direction so as to align each of the locking assemblies 80 with a respective slot 72 in the periphery of the hatch plate 48, whereupon the hatch plate may be removed from the aperture 14 in the chamber's bottom panel by pivoting upward displacement of the swing bracket 22. For illustration purposes, hatch plate 48 is shown in the locked position in FIG. 1 and in the unlocked position in FIG. 2.

Postioned within the hub's bore 36a and extending along the length of the hub 36 is a generally cylindrical actuating shaft 42 which is free to rotate within the hub. The upper end of the actuating shaft 42 is provided with a hex head coupling 44, while the lower end of the actuating shaft 42 is provided with a generally cylindrical, threaded aperture within which is positioned a shoulder screw 52. Coupled to the lower end of the actuating shaft 42 by means of the shoulder screw 52 is a generally circular, planar pressure plate 50. Positioned between the lower end of the actuating shaft 42 and the upper surface of the pressure plate 50 about the shoulder screw 52 is a thrust washer 68. The thrust washer 68 allows for rotational displacement of the actuating shaft 42 relative to the shoulder screw 52 and the pressure plate 50. The bore 36a of the hub 36 and the lateral surface of the actuating shaft 42 are provided with complementary threaded portions which provide mutual engagement therebetween. Rotation of the actuating shaft 42 in a first direction raises the pressure plate 50 relative to the hatch plate 48, while rotation of the actuating shaft in a second direction lowers the pressure plate.

Located within the pressure plate 50 are a plurality of apertures 78 and 79. Positioned within each of the apertures 78, 79 is a respective mounting disc 54, 56. Each of the mounting discs 54, 56 is mounted to and suspended from the hatch plate 48 by means of a pair of shoulder screws 60, 62. Coupled between each of the mounting discs 54, 56 and each of its associated screws is a light wire spring 99 for biasing the mounting disc generally upward along the axial direction of the parallel shoulder screws. First and second magnets 64, 66 are respectively positioned within and coupled to the first and second mounting discs 54, 56 by means of a respective set screw 58 threadably positioned within the mounting disc. In a preferred embodiment, three mounting discs each with a magnet coupled thereto are positioned within the pressure plate 50 in an equally spaced manner about the center-located shoulder screw 52 therein.

A contaminant is transferred from the sealed chamber 12 to a covered container 18 in the following manner. A container 18 having a ferrous cover or lid 20 loosely positioned thereon is aligned and positioned over the aperture 14 within the bottom panel 16 of the sealed chamber 12. The upper, peripheral edge of the container 18 includes a lip portion 18a which is positioned in abutting contact with a lower gasket 92 attached to the lower surface of the chamber's bottom panel 16 around the aperture 14 therein. The container 18 is open at the top and is adapted to receive the cover 20 which has a generally flat upper surface and includes a recessed slot 25 around the periphery thereof. The cover 20 further includes a peripheral lip 20a around the upper, outer edge thereof. As can be seen from FIG. 1, the cover 20 is of the general paint can type.

The container 18 may be positioned and maintained in sealed engagement with the lower gasket 92 by conventional means (not shown) which do not form a part of the present invention. For example, the aforementioned cross referenced related application describes a container alignment and positioning system compatible with the present invention. Once the container 18 is positioned in sealed engagement with the lower gasket 92 and about the aperture 14 in the chamber's bottom panel 16, the can-out hatch assembly 10 removes the cover 20 which is loosely positioned upon the container to allow a contaminant to be transferred from the sealed chamber 12 to the container 18. Positioned around the periphery of the sealed chamber's aperture 14 in spaced relation and securely mounted to the lower surface of the chamber's bottom panel 16 are a plurality of container guides 96. Each container guide 96 is securely mounted to the sealed chamber's bottom panel 16 by means of a respective mounting screw 98 and includes a lower, tapered portion 96a to facilitate positioning of the container's upper peripheral lip 18a in close spaced relation about the sealed chamber's aperture 14 and in engagement with the lower gasket 92.

The can-out hatch assembly 10 of the present invention operates in the following manner to allow a contaminant to be removed from the sealed chamber 12 and positioned within the container 18 without exposing either the surrounding environment or outer portions of the can-out hatch assembly to the contaminant. With the cover 20 loosely positioned on the upper, open end portion of the container 18, the container is positioned in sealed engagement with the lower gasket 92 about the sealed chamber's aperture 14. Prior to positioning of the container 18 in contact with the lower gasket 92, the hatch plate 48 is positioned in sealed engagement with the chamber's bottom panel 16. With the container 18 in position, the first and second magnets 64, 66 are positioned in contact with the upper, generally flat surface of the ferrous container cover 20. Magnetic force then pulls the cover 20 upward in contact with an inner gasket 94 positioned upon a lower surface of the pressure plate 50. Each of the mounting discs 54, 56 is loosely suspended from the hatch plate 48 and is freely displaceable in a generally vertical direction over a limited distance to permit the magnets therein to be pulled down by gravity for engaging the upper surface of the cover 20.

With the container 18 positioned in sealed contact with the lower gasket 92 about the aperture 14 within the chamber's bottom panel 16, the hatch assembly's actuating arm 38 then may be rotated in a clockwise direction as shown in FIG. 2 in order to disengage the cam surfaces 70 about its periphery from a respective locking assembly 80. The remote controller 74 may be used to thus rotate the actuating arm 38. With the hatch plate 48 thus unlocked from the sealed chamber's bottom panel 16, the hatch assembly may be displaced upward by pivoting the swing bracket 22 about the pivot bracket 26. Again, upward displacement of the can-out hatch assembly 20 may be accomplished by the engagement and upward displacement of the actuating arm 38 by the remote controller 74. Upward displacement of the can-out hatch assembly 10 removes the cover 20 from the container 18 allowing a contaminant to be transferred from the sealed chamber 12 to the container.

Once the contaminant is positioned within the container 18, the can-out hatch assembly 10 is then positioned over the aperture 14 within the sealed chamber by the downward, pivoting displacement of the swing bracket 22. The can-out hatch assembly 10 may thus be positioned by engagement of the actuating arm 38 by the remote controller 74. With the hatch plate 48 positioned over the sealed chamber's aperture 14, the actuating arm 38 is then rotated in a counterclockwise direction in order to engage each of the cam surfaces 70 with a respective locking assembly 80 in order to securely position the hatch plate over the aperture in a sealed manner. With the hatch plate thus positioned over the aperture 14, the actuating shaft 42 is then rotated in a clockwise direction by engagement of its upper hex head portion 44 by the remotely operated socket wrench 76. Rotation of the actuating shaft 42 in a clockwise direction results in its downward displacement as well as the downward displacement of the pressure plate 50 coupled thereto. With the first and second magnets 64, 66 engaging and supporting the container's cover 20, the cover is similarly displaced downward and is positioned on the upper, peripheral portion of the container 18. Further downward displacement of the combination of the actuating shaft 42 and pressure plate 50 strips the cover 20 from the magnets and causes the cover to be securely positioned in a sealed manner upon the open upper end of the container 18. The inner gasket 94 positioned on the lower, peripheral portion of the pressure plate 50 engages the upper, peripheral portion of the container's cover 20 so as to force the outer edge of the cover 20 in sealed engagement with the upper edge of the container 18. Once the cover 20 is securely positioned upon the container 18 in a sealed manner, the actuating shaft 42 is rotated in a counterclockwise direction displacing the pressure plate 50 upward to ready the can-out hatch assembly for the next container 18. The container 18 may then be removed from the bottom panel 16 of the sealed chamber 12, the contents and inner portions thereof thus isolated from the surrounding environment by the can-out hatch assembly 10 which is positioned over and seals the chamber's aperture 14.

There has thus been shown a can-out hatch assembly for facilitating the transfer of a contaminant from a sealed chamber to a covered container which allows for removal of the container's cover while maintaining sealed engagement between the container and the sealed chamber about an aperture therein. The exterior portion of the hatch assembly is covered by the container's lid and is thus shielded from the contaminant during its transfer. Thus, with the hatch assembly again positioned over the chamber's aperture in a sealed manner following contaminant transfer, the container may be removed from adjacent to the aperture with the exterior surface of the hatch assembly remaining "clean", not having been exposed to the contaminant during its transfer. Provision is made for remote operation of the can-out hatch assembly which ensures that the contaminant remains isolated from the surrounding environment before, during and after its transfer from the sealed chamber to the covered container.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A hatch assembly for sealing an aperture within a wall of a sealed chamber in a first closed position while permitting the transfer of a contaminant from said chamber to a container positioned in sealed engagement with said wall around the aperture therein in a second open position, said container having a ferrous cover positioned thereon, said hatch assembly comprising:

an elongated member pivotally mounted at a first end thereof to an inner surface of the sealed chamber's wall and having a second end positioned over the aperture in the wall when said elongated member is in a first lowered position;

hatch means coupled to said elongated member adjacent to the second end thereof for covering the aperture in the sealed chamber's wall when said elongated member is in the first lowered position;

first displacement means coupled to said hatch means for rotationally displacing said hatch means;

locking means mounted to the inner surface of the wall for engaging and locking said hatch means in sealed engagement with the wall about the aperture therein when said hatch means is rotated in a first direction and for releasing said hatch means from sealed engagement with the wall when said hatch means is rotated in a second direction by said first rotational displacement means;

engaging means movably coupled to and positioned immediately below said hatch means for engaging the cover of the container; and second displacement means coupled to said engaging means for moving said engaging means from a first raised position to a second lowered position wherein said engaging means engages the cover for removing the cover from the container prior to transfer of the contaminant when said elongated member is pivotally displaced to a second upraised position, wherein the container's cover shields said second displacement means from exposure to the contaminant, and for displacing the cover downward and in sealed engagement with the container following transfer of the contaminant when said elongated member is in the first lowered position.

2. A hatch assembly in accordance with claim 1 further comprising, in combination, a pivot pin and a pivot bracket coupling the first end of said elongated member to an inner surface of the sealed chamber's wall.

3. A hatch assembly in accordance with claim 1 further comprising remote control means within the sealed chamber for displacing said elongated member between the first lowered position and the second upraised position.

4. A hatch assembly in accordance with claim 1 wherein the second end of said elongated member includes an aperture wherein are positioned said first and second displacement means.

5. A hatch assembly in accordance with claim 4 wherein said first displacement means includes a generally vertically oriented rotatable hub positioned within the aperture of said elongated member and having upper and lower end portions, wherein said lower end portion is coupled to said hatch means.

6. A hatch assembly in accordance with claim 5 wherein said first displacement means further includes an actuating arm coupled to the upper end portion of said hub to facilitate the rotation thereof.

7. A hatch assembly in accordance with claim 5 further comprising remote control means within the sealed chamber for engaging and rotationally displacing said actuating arm.

8. A hatch assembly in accordance with claim 5 further including a thrust washer positioned around said hub and between said elongated member and said hatch means to facilitate rotational displacement therebetween.

9. A hatch assembly in accordance with claim 5 further including rotation limiting means coupled between said elongated member and said hatch means for limiting the rotational displacement of said hatch means between a first and a second position, wherein said hatch means is in sealed engagement with the chamber's wall when in said first position and is disengaged from the chamber's wall in said second position.

10. A hatch assembly in accordance with claim 9 wherein said elongated member includes a pair of slots therein and said rotation limiting means includes first and second pins coupled to said hatch means and positioned within a respective slot in said elongated member and wherein the ends of said slots define the limits of the rotational displacement of said hatch means.

11. A hatch assembly in accordance with claim 5 wherein said engaging means includes a pressure plate for displacing the cover downward and in sealed engagement with the container following transfer of the contaminant, said engaging means further including magnetic means positioned within said pressure plate for coupling to and removing the cover from the container.

12. A hatch assembly in accordance with claim 11 wherein said magnetic means comprises a plurality of magnets displaceably coupled to said hatch means and positioned within said pressure plate, wherein each of said magnets is movable within said pressure plate toward and away from said hatch means.

13. A hatch assembly in accordance with claim 12 wherein said rotatable hub is cylindrical having an elongated bore extending the length thereof and said engaging means further includes a rotatable actuating shaft positioned within said hub and coupled at a lower end thereof to said pressure plate, wherein said pressure plate is vertically displaced by rotation of said actuating shaft.

14. A hatch assembly in accordance with claim 13 wherein said hub includes a threaded inner portion and said actuating shaft includes a threaded outer portion with said respective threaded inner and outer portions in mutual engagement and wherein said actuating shaft and said pressure plate are vertically displaced by rotation of said actuating shaft within said hub.

15. A hatch assembly in accordance with claim 14 further including remote control means within the sealed chamber for engaging an upper end portion of said actuating shaft in rotationally displacing said actuating shaft.

16. A hatch assembly in accordance with claim 15 wherein the upper end portion of said actuating shaft includes a hex head coupling.

17. A hatch assembly in accordance with claim 16 wherein said actuating shaft is coupled to said pressure plate by a threaded coupling pin and wherein said hatch assembly further includes a thrust washer positioned between the lower end portion of said actuating shaft and said pressure plate.

18. A hatch assembly in accordance with claim 1 further including a compressible seal positioned between said hatch means and the chamber's wall around the aperture therein.

19. A hatch assembly in accordance with claim 1 further including a compressible seal positioned between said engaging means and the container cover around the periphery thereof.

20. A hatch assembly in accordance with claim 1 further including a compressible seal positioned between an upper edge portion of the container and a lower surface of the chamber's wall around the aperture therein.

21. A hatch assembly in accordance with claim 1 wherein said hatch means is generally circular and includes a plurality of paired slots and adjacent cam surfaces around the periphery thereof and wherein said locking means includes a plurality of brackets spaced around the periphery of said hatch means and mounted to the inner surface of the wall and adapted to engage a respective cam surface when said hatch means is rotated in said first direction.

22. A hatch assembly in accordance with claim 1 further including guide means mounted to the wall of the container adjacent to the aperture therein for positioning the container over said aperture and in sealed engagement with the chamber's wall.

* * * * *